United States Patent Office 2,951,856
Patented Sept. 6, 1960

2,951,856

PROCESS OF DEHYDROBROMINATING KETO STEROIDS AND PRODUCTS OBTAINED THEREBY

Robert Joly, Montmorency, and Gerard Nomine, Noisy le Sec, France, assignors to Les Laboratoires Francais de Chimiotherapie, Paris, France, a body corporate of France No Drawing. Filed June 27, 1955, Ser. No. 518,376

Claims priority, application France July 29, 1954

12 Claims. (Cl. 260—397.3)

The present invention relates to an improved process of dehydrobrominating keto steroid compounds which are brominated in α-position to the keto group and to valuable intermediate products obtained during said dehydrobromination process.

It is one object of the present invention to provide a simple and highly advantageous process of producing α,β-unsaturated keto steroid compounds by dehydrobromination of the corresponding α-brominated keto steroid compounds by means of specific hydrazide compounds, namely alkyl carbazates whereby readily crystallizable alkoxy carbonyl hydrazones are formed as intermediate products which can easily be purified and split up to yield α,β-unsaturated keto steroid compounds.

Another object of the present invention is to provide valuable alkoxy carbonyl hydrazone compounds of α,β-unsaturated keto steroids which are obtained in easily purifiable form and which can readily be split up to the corresponding α,β-unsaturated keto steroids.

Other objects of the present invention and advantageous features thereof will become apparent as the description proceeds.

Several processes of dehydrohalogenating steroid compounds are known. Such dehydrohalogenation is effected, for instance, by means of tertiary bases or potassium acetate. However, said dehydrohalogenating agents often produce the desired unsaturated steroid compounds only in a mediocre yield and frequently in a very low yield.

The process described by Mattox and Kendall in "Journal of the American Chemical Society," vol. 70, page 882 (1948), uses, for dehydrohalogenation, monocyclic aryl hydrazines and especially 2,4-dinitro phenyl hydrazine. According to said process, the hydrazone of the unsaturated ketone is directly obtained whereby one molecule of hydrogen bromide is split off in the course of this reaction. However, the difficulties of splitting up said hydrazones and their low solubility have prevented this reaction from becoming accepted practice. Instead, the method described by Djerassi in "Journal of the American Chemical Society," vol 71, page 1003 (1949), is the method preferred in the art. According to said method, semicarbazide is used as dehydrohalogenating agent. Said semicarbazide forms in a manner similar to that of the above mentioned monocyclic aryl hydrazines, the corresponding semicarbazones of α,β-unsaturated keto steroids. Said semicarbazones can readily be split up and yield thereby the desired unsaturated keto steroids.

While these known processes make use of substituted hydrazines, the present invention is based upon the use of specific hydrazide compounds for dehydrobromination of α-brominated keto steroid compounds. Said hydrazides, which will be designated hereinafter and in the claims as carbazates, correspond to the following Formula I:

RO—CO—NH—NH₂

In said formula, R indicates an alkyl radical and preferably a lower alkyl radical. Reaction of said hydrazide with an α-brominated keto steroid compound yields the corresponding alkoxy carbonyl hydrazones of α,β-unsaturated keto steroids corresponding to the following Formula II

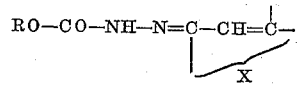

In said formula, R indicates an alkyl radical while X together with the group

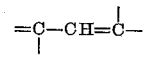

forms a steroid ring system. Said alkoxy carbonyl hydrazones readily crystallize, can easily be purified, and can be split up without any difficulty to the corresponding unsaturated keto steroids, preferably by means of acetone containing hydrochloric acid.

The high solubility of the carbazates used in this process is another very important advantage of the present invention since it permits working in very concentrated reaction medium and thus avoids the large volumes which must be employed when dehydrobrominating by means of semicarbazide.

The carbazates of Formula I are readily prepared by reacting the corresponding alkyl carbonates with an equimolecular amount of hydrazine since said hydrazine reacts only with one of the alkoxy groups of the alkyl carbonates.

Of these carbazates, the ethyl carbazate of the formula C₂H₅O—CO—NH—NH₂ is very readily available since ethyl carbonate is an inexpensive commercial product. The resulting carbazate reagent which is readily soluble in a number of organic solvents and especially in acetic acid has not yet found industrial application in steroid chemistry. It is entirely unexpected and could not be foreseen that this hydrazide would react with α-brominated keto steroids and that it would effect dehydrobromination without, at the same time forming undesired by-products. Other hydrazides, such as the Girard reagents T and P do not exhibit this property. Actually Gallagher has shown in "Journal of Biological Chemistry," vol. 184, page 396 (1950), that said Girard reagents T and P react with α-brominated keto steroids in a different manner. Thtey enter into a water soluble combination with said α-brominated keto steroids and it is not possible to regenerate therefrom the keto steroids. In contrast hereto, the condensation products of the carbazates according to the present invention with α-brominated keto steroids yield readily and quantitatively the corresponding α,β-unsaturated keto steroids on reaction with acetone which contains hydrochloric acid.

The new process according to the present invention can be applied not only to α-brominated steroid compounds having the keto group in 3-position but also to α-brominated keto steroid compounds having the keto group in another position, for instance, in 12-position.

In addition to its great simplicity, the process acording to the present invention has the further advantage that in a number of instances a much better yield is obtained than when carrying out dehydrobromination by means of semicarbazide. This is the case, for instance, in the production of Reichstein's "Substance S," i.e. 17α,21-dihydroxy-Δ⁴-pregnene-3,20-dione.

Furthermore, ethyl carbazate is especially suitable for protecting the keto group in 20-position of acyl ketols of the pregnane series. Thus, it is possible to produce the 3,20-di-ethoxy carbonyl hydrazone of cortisone acetate by directly condensing said cortisone acetate with ethoxy carbonyl hydrazide or by dehydrobrominating 17-hydroxy-21-acetoxy-4-bromo pregnane-3,11,20-trione.

In contrast hereto, it is not possible to obtain the corresponding di-semicarbazone by the process disclosed by Wendler, Huang-Minlon, and Tishler, "Journal of the American Chemical Society," vol. 73, page 3818 (1951). No such di-semicarbazones were obtainable even when working under most favorable conditions and considerably increasing the amount of semicarbazide. However, like all other carbonyl reagents, the carbazates of Formula I do not react with steroids having a keto group in 11-position. Consequently, formation of the 3,20-diethoxy carbonyl hydrazone of cortisone acetate permits reduction of the remaining free keto group to the secondary alcohol group in 11β-position. Said di-hydrazone thus represents a very valuable starting material for the production of hydrocortisone. Furthermore, since 17,21-dihydroxy-4-bromo pregnane - 3,11,20 - trione heretofore permitted the production of the disemicarbazone of cortisone only with a yield of about 30%, the present process represents a very important improvement over said known process since the di-alkoxy carbonyl hydrazone of cortisone is obtained from the same bromo compound in an almost quantitative yield.

In principle, the process according to the present invention consists in reacting two molecules of an alkyl carbazate of Formula I, one molecule thereof serving for neutralization of hydrogen bromide split off during said reaction, either as such or dissolved in an organic solvent, with a solution or a suspension of an α-brominated keto steroid in the same or a different solvent. The reaction is completed after a rather considerable period of time when working at room temperature or, more rapidly, when operating at an elevated temperature comprised between 30° C. and the reflux. The reaction is catalytically accelerated by the addition of low molecular organic acids to the reaction mixture and proceeds especially rapidly in acetic acid. After the condensation is completed, the resulting alkoxy carbonyl hydrazone of the unsaturated keto steroid of Formula II can be isolated and purified and then split up by means of acetone containing hydrochloric acid. Or the reaction mixture containing the hydrazone formed can directly be reacted with acetone which contains hydrochloric acid.

The process according to the present invention can be used not only to the formation of the above mentioned "Substance S," cortisone, and hydrocortisone but also for the production of desoxycorticosterone, progesterone, testosteron, and the like keto steroids from corresponding saturated keto steroids. Bromination of said saturated keto steroids can be carried out according to known methods. Especially suitable has proved the method disclosed and claimed in copending application Serial No. 360,878 of Gerard Nomine and Julien Warnant, filed June 11, 1953, entitled a Method of Producing α-Brominated Keto Steroid Compounds. According to said process, a mixture of the N-bromo succinimide and a keto steroid or a hydroxy steroid compound is heated in the presence of water and an oxidizable alcohol and, preferably, in the presence of an organic solvent to a temperature between about 50° C. and about 70° C. whereby the proportions of the reaction components, calculated for each bromine atom introduced in α-position to the keto group, are about one mol of keto steroid compound to about 2 mols of N-bromo succinimide to at least about 1 mol of oxidizable alcohol or, respectively, 1 mol of hydroxy steroid compound to about 2 mols of N-bromo succinimide to at least about 1 mol of oxidizable alcohol.

The following examples serve to illustrate the present invention without, however, limiting the same thereto.

EXAMPLE 1

*Dehydrobromination of 4-bromo-17α-hydroxy-21-acetoxy pregnane-3,20-dione*

A suspension of 3 g. of 4-bromo-17α-hydroxy-21-acetoxy pregnane-3,20-dione in 5 times its volume of crystallizable acetic acid is heated on the water bath. A solution of 1.5 g. of ethyl carbazate in 3 cc. of acetic acid is slowly added to said suspension. After half an hour, 150 cc. of acetone and 30 cc. of concentrated hydrochloric acid are added while stirring. The reaction mixture is cooled, filtered, dried, and recrystallized from aqueous acetic acid (70%). In this manner the acetate of "Substance S," i.e. the 21-acetate of 17α,21-dihydroxy-Δ⁴-pregnene-3,20-dione is obtained in a yield of 80%. Melting point (on the Maquenne block): 238–240° C.; rotatory power $[\alpha]_D^{20}=+112.5°\pm3°$ (concentration: 0.2% in acetone).

The starting material can be obtained according to the process of the above mentioned copending application Serial No. 360,878 by bromo oxidation of 3α,17α-dihydroxy-21-acetoxy pregnane-3-one or by bromination of 17α-hydroxy-21-acetoxy pregnane-3,20-dione.

The yield, on dehydrobromination with semicarbazide, amounts to only 55%.

EXAMPLE 2

*Dehydrobromination of 4-bromo-17β-acetoxy etiocholane-3-one*

2 g. of 4-bromo-17β-acetoxy etiocholane-3-one are suspended in 8 cc. of acetic acid. 1.15 g. of ethyl carbazate are added to said suspension. After allowing the mixture to stand for ½ hour, it is poured, while stirring, into water. The precipitated ethoxy carbonyl hydrazone of testosterone is filtered off, washed with water and hydrolyzed by stirring with aqueous acetone and hydrochloric acid as described in Example 1. Testosterone acetate having the same characteristic properties, as they are known from the literature, is obtained.

When starting with the 17β-propionate of 4-bromo etiocholane-3-one and proceeding in the same manner as described hereinabove, the corresponding testosterone propionate is obtained.

EXAMPLE 3

*Dehydrobromination of 4-bromo-21-acetoxy pregnane-3,20-dione*

A solution of 10 g. of ethyl carbazate in 20 cc. of acetic acid is slowly added to a solution of 20 g. of 4-bromo-21-acetoxy pregnane-3,20-dione in 80 cc. of acetic acid. The mixture is allowed to stand for ¼ hour and is then poured in water, while stirring. The precipitated ethoxy carbonyl hydrazone of 21-acetoxy-Δ⁴-pregnene-3,20-dione is filtered off, washed with water, and recrystallized from methanol. Said compound has a melting point (on the Maquenne block) of 120° C.; a rotatory power $[\alpha]_D^{20}=+260°$ (concentration: 1% in chloroform). Its U.V. spectrum in ethanol at 95° is: λ 267.5 mμ, ε=30,650. The compound loses 4% of its weight on drying in a vacuum at 80° C. Said loss of solvent, however, does not affect the melting point.

Analysis for $C_{26}H_{38}O_5N_2=458.6$. Calculated: 68.09% C; 8.35% H; 17.44% O; 6.1% N. Found: 68.0% C; 8.5% H; 17.2% O; 6.1% N.

Hydrolysis of said alkoxy carbonyl hydrazone is effected by gently warming the same with 600 cc. of aqueous 85% acetone and 150 cc. of hydrochloric acid on the water bath to lukewarm temperature for ¼ hour. The hydrolysis mixture is then precipitated by means of water. The precipitate is filtered off, washed with water, dried, and recrystallized from ethyl acetate. A first portion of 7.4 g. of the acetate of desoxycorticosterone melting at 158° C. and having a rotatory power $[\alpha]_D^{20}=+184°$ (concentration: 1% in ethanol), is obtained. The product recovered from the mother liquors is recrystallized. The overall yield amounts to 68%.

EXAMPLE 4

*Dehydrobromination of 4-bromo-17α-hydroxy-21-acetoxy pregnane-3,11,20-trione*

20 g. of 4-bromo-17α-hydroxy-21-acetoxy pregnane-3,11,20-trione are reacted with 7.5 g. of ethyl carbazate (2 mols) by following the procedure described in the foregoing examples. 19.1 g. of the ethoxy carbonyl hydrazone of cortisone acetate are obtained thereby. The yield amounts to 93%. The compound is recrystallized from methanol and acetone and has a melting point of 165° C. and a rotatory power $[\alpha]_D^{20} = +275°$ (concentration: 1% in chloroform).

Analysis for $C_{26}H_{36}O_7N_2 = 488.57$. Calculated: 63.92% C; 7.42% H; 5.73% N; 22.92% O. Found: 64.3% C; 7.4% H; 5.6% N; 22.9% O.

Hydrolysis of said compound by means of a mixture of aqueous acetone nad concentrated hydrochloric acid according to the procedure described in the preceding examples yields cortisone acetate of the melting point (on the Maquenne block): 243° C. and the rotatory power $[\alpha]_D^{20} = +185°$ (concentration: 1% in acetone). The yield is 90%.

When operating in the same manner as described hereinbefore but reacting 50 g. of 4-bromo-17α-hydroxy-21-acetoxy pregnane-3,11,20-trione with 47.5 g. (4 mols) of ethyl carbazate, the pure 3,20-diethoxy carbonyl hydrazone of cortisone acetate is obtained, after recrystallization from methanol, in a yield of 70% as a first portion. A further amount of 10% can be recovered from the mother liquors. The resulting compound has the following characteristic properties: Melting point (on the Maquenne block): 223–225° C.; rotatory power $[\alpha]_D^{20} = +284-289°$ (concentration: 1% in chloroform). U.V. spectrum in ethanol: λ 237 mμ, ε=21,500; λ 274 mμ, ε=18,300.

Analysis for $C_{29}H_{42}O_8N_4 = 574.65$. Calculated: 60.61% C; 7.36% H; 9.75% N. Found: 60.8% C; 7.5% H; 9.7% N.

EXAMPLE 5

*Dehydrobromination of 4-bromo pregnane-3,20-dione*

20 g. of pure 4-bromo pregnane-3,20-dione are reacted in 60 cc. of acetic acid with 7.6 g. of ethyl carbazate as described in the preceding examples. The 3,20-di-ethoxy carbonyl hydrazone of progesterone is obtained in a yield of 99%. After recrystallization from acetone or methyl ethyl ketone, the melting point of said compound is 165° C. (on the Maquenne block). Its rotatory power $[\alpha]_D^{20} = +210-215°$ (concentration: 1% in chloroform).

Analysis for $C_{27}H_{42}O_4N_4 = 486.84$. Calculated: 66.63% C; 8.7% H; 11.5% N; 13.5% O. Found: 66.8% C; 8.6% H; 11.5% N; 13.6% O.

Said compound, on hydrolysis with acetone and hydrochloric acid as described in the preceding examples and after recrystallization from acetone, yields progesterone in a yield of 85%.

It is not necessary to isolate the intermediate di-ethoxy carbonyl hydrazone since the reaction solution can directly be hydrolyzed whereby progesterone is obtained in a yield of 94%.

EXAMPLE 6

*Dehydrobromination of 4-bromo-17β-acetoxy etiocholane-3-one by means of methyl carbazate*

The procedure is the same as described in Example 2. However, in place of ethyl carbazate, there are used equimolecular amounts of methyl carbazate. In this manner there is obtained the methoxy carbonyl hydrazone of testosterone. Said compound, on recrystallization from a mixture of methanol and diisopropyl ether (1:2) melts at 137° C. (with decomposition). Its rotatory power $[\alpha]_D^{20} = +203°$ (concentration: 1% in chloroform). Its U.V. spectrum in ethanol at 95° C. is λ 268 mμ, ε=22,900. The compound is very soluble in ethanol, soluble in chloroform, and only slightly soluble in ether.

Analysis for $C_{23}H_{34}O_4N_2 = 402.5$. Calculated: 68.62% C; 8.51% H; 6.96% N. Found: 68.7% C; 8.9% H; 6.9% N.

In place of ethyl carbazate and methyl carbazate used as the one reaction component in the preceding examples, there can be employed equimolecular amounts of other alkyl carbazates corresponding to the above given Formula I and especially other lower alkyl carbazates, such as the propyl, isopropyl, n-butyl, and the like lower carbazates. The procedure to be followed when using these other alkyl carbazates is the same as described in said preceding examples.

In place of the steroid ketones and their α-bromo derivatives employed as the other reaction component in the preceding examples, there can be used equimolecular amounts of other steroid ketones and their α-bromo derivatives such as 4-bromo-11-hydroxy-21-acetoxy pregnane-3,20-dione,
4-bromo-21-acetoxy pregnane-3,11,20-trione,
4-bromo-17-hydroxy corticosterone-21-propionate,
4-bromo-17α-methyl androstane-3-one-17β-ol,
4-bromo-17-ethinyl androstane-3-one.

Otherwise the procedure is followed as described in said preceding examples.

In place of acetic acid used as solvent in the preceding examples, other organic solvents which do not react with the carbazate can be used.

Of course, many other changes and variations in the reaction conditions, the temperature and duration, the manner and order in which the reacting components are reacted with each other, the concentration of the acetone and, in general, of the hydrolyzing agent and its water content as well as the concentration of the hydrochloric acid or other inorganic acid, the method of working up and of purifying the resulting alkoxy carbonyl hydrazones and the unsaturated ketones obtained therefrom, and the like may be made by those skilled in the art in accordance with the principles set forth herein and in the claims annexed hereto.

We claim:

1. The 3-ethoxy carbonyl hydrazone of 17α-hydroxy-21-acetoxy-Δ⁴-pregnene-3,20-dione.
2. The 3-ethoxy carbonyl hydrazone of testosterone acetate.
3. The 3-ethoxy carbonyl hydrazone of testosterone propionate.
4. The 3-ethoxy carbonyl hydrazone of cortisone acetate.
5. The 3,20-di-ethoxy carbonyl hydrazone of cortisone acetate.
6. The 3,20-di-ethoxy carbonyl hydrazone of progesterone.
7. The 3-ethoxy carbonyl hydrazone of desoxycorticosterone acetate.
8. The 3-methoxy carbonyl hydrazone of testosterone acetate.
9. The 3-lower alkoxy carbonyl hydrazones of progesterone of the following formula:

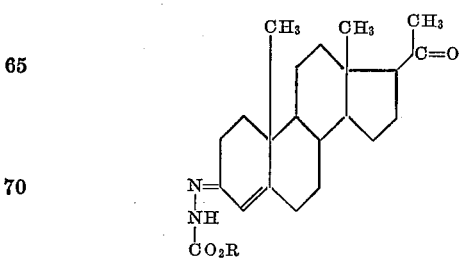

wherein R is a lower alkyl radical containing less than 3 carbon atoms.

10. The 3-(lower) alkoxy carbonyl hydrazones of the formula

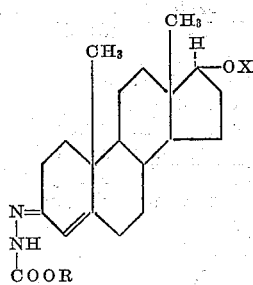

wherein R indicates a lower alkyl radical with less than 3 carbon atoms; and X indicates a member selected from the group consisting of hydrogen and a lower alkanoyl group.

11. In a process for the introduction of a 4,5-double bond into 3-keto-4-bromo steroids which comprises reacting a 3-keto-4-bromo steroid with semicarbazide to form the corresponding Δ⁴-3-keto steroid, the improvement which consists of employing an alkyl carbazate in lieu of the semicarbazide to form the corresponding alkoxy carbonyl hydrazone.

12. The lower alkoxy carbonyl hydrazones selected from the group consisting of the 3-lower alkoxy carbonyl hydrazones of the 17α,21-dihydroxy-Δ⁴-pregnene-3,20-dione, cortisone, hydrocortisone, desoxycorticosterone, progesterone, and testosterone, the 3,20-di-lower alkoxy carbonyl hydrazones of cortisone and progesterone, the 3-lower alkoxy carbonyl hydrazone of the 17-lower alkanoyl esters of testosterone, and the 21-lower alkanoyl esters of said lower alkoxy carbonyl hydrazones of the 17α,21-dihydroxy-Δ⁴-pregnene-3,20-dione, cortisone, hydrocortisone, and desoxycorticosterone.

References Cited in the file of this patent

UNITED STATES PATENTS

| | | |
|---|---|---|
| 2,156,275 | Butenandt | May 2, 1939 |
| 2,160,719 | Butenandt | May 30, 1939 |
| 2,516,259 | Sarett | July 25, 1950 |
| 2,527,999 | Johnson | Oct. 21, 1950 |
| 2,590,978 | Kendall et al. | Apr. 1, 1952 |
| 2,590,993 | McGuckin et al. | Apr. 1, 1952 |
| 2,593,248 | Bernstein | Apr. 15, 1952 |
| 2,609,379 | Ruschig | Sept. 2, 1952 |
| 2,628,966 | Graber | Feb. 17, 1953 |
| 2,664,428 | Miescher | Dec. 29, 1953 |
| 2,708,673 | Levin et al. | May 17, 1955 |
| 2,781,367 | Day | Feb. 12, 1957 |

OTHER REFERENCES

Rabjohn et al.: J.A.C.S., pages 2259–2261, May 5, 1953.